United States Patent [19]
Park

[11] Patent Number: 6,002,752
[45] Date of Patent: Dec. 14, 1999

[54] METHOD AND APPARATUS FOR CHANGING OPERATIONAL MODE OF A FACSIMILE SYSTEM

[75] Inventor: Seong-Kyoo Park, Daegukwangyeok, Rep. of Korea

[73] Assignee: SamSung Electronics Co., Ltd., Suwon, Rep. of Korea

[21] Appl. No.: 08/786,137

[22] Filed: Jan. 21, 1997

[30] Foreign Application Priority Data

Jan. 19, 1996 [KR] Rep. of Korea ..................... 96-1168

[51] Int. Cl.[6] ............... H04M 11/00; H04N 1/00; H04N 1/32
[52] U.S. Cl. ............... 379/100.15; 358/434; 358/468
[58] Field of Search ................... 379/56.1–56.3, 379/93.09, 93.11, 100.09, 100.15–100.16, 102.01–102.02, 88.15, 93.25; 340/825.44; 358/434, 468, 442; 455/31.1, 31.2

[56] References Cited

U.S. PATENT DOCUMENTS

| | | | |
|---|---|---|---|
| 4,901,343 | 2/1990 | Yamaguchi | 379/100.15 |
| 4,908,851 | 3/1990 | Kotani et al. | 379/100.15 |
| 4,939,772 | 7/1990 | Goto | 379/102.02 |
| 5,065,427 | 11/1991 | Godbole | 379/100.15 |
| 5,086,455 | 2/1992 | Satomi et al. | 379/100.16 |
| 5,131,026 | 7/1992 | Park | 379/100.16 |
| 5,189,693 | 2/1993 | Nakajima | 379/100.17 |
| 5,216,706 | 6/1993 | Nakajima | 379/102.02 |
| 5,255,311 | 10/1993 | Yoshida | 379/100.15 |
| 5,260,991 | 11/1993 | Ikegaya | 379/100.15 |
| 5,323,451 | 6/1994 | Yatsunami | 379/100.01 |
| 5,333,179 | 7/1994 | Yamamoto et al. | 379/100.16 |
| 5,337,349 | 8/1994 | Furohashi et al. | 379/100.14 |
| 5,398,280 | 3/1995 | MacConnell | 379/93.25 |
| 5,416,828 | 5/1995 | Hiramatsu et al. | 379/100.15 |
| 5,428,673 | 6/1995 | Nakagawa et al. | 379/100.15 |
| 5,448,378 | 9/1995 | Matsumoto | 358/468 |
| 5,487,105 | 1/1996 | Sakai | 379/100.15 |
| 5,490,200 | 2/1996 | Snyder et al. | 455/31.2 |
| 5,493,609 | 2/1996 | Winseck, Jr. et al. | 379/100.15 |
| 5,495,344 | 2/1996 | Callaway, Jr. et al. | 358/400 |
| 5,510,907 | 4/1996 | Koichi | 379/88.15 |
| 5,563,453 | 10/1996 | Nyfelt | 379/102.1 |
| 5,564,077 | 10/1996 | Obayashi et al. | 455/33.2 |
| 5,798,707 | 8/1998 | Camire | 379/102.01 |

FOREIGN PATENT DOCUMENTS 06237310  8/1994  Japan ..................... H04M 11/00

*Primary Examiner*—Curtis A. Kuntz
*Assistant Examiner*—George Eng
*Attorney, Agent, or Firm*—Robert E. Bushnell, Esq.

[57] ABSTRACT

A facsimile system having a paging receiver operable in connection with a radio pager, and process of automatically changing an operational mode of the facsimile system in one of a voice communication (TEL) mode or a data communication (FAX) mode through a telephone line, including the steps of periodically checking data received from a radio pager, and changing the operational mode upon receipt of predetermined data.

22 Claims, 3 Drawing Sheets

METHOD AND APPARATUS FOR CHANGING OPERATIONAL MODE OF A FACSIMILE SYSTEM

CLAIM FOR PRIORITY UNDER 35 U.S.C. §119

This application makes reference to, incorporates the same herein, and claims all benefits accruing under 35 U.S.C. §119 from an application for *Method For Changing Operational Mode of A Facsimile Machine* earlier filed in the Korean Industrial Property Office on Jan. 19, 1996, and there duly assigned Serial No. 1168/1996.

BACKGROUND OF THE INVENTION

Technical Field

The present invention relates to a facsimile system and method for changing an operational mode of the facsimile system from a remote station, and more particularly, relates to a facsimile system having a paging receiver incorporated therein for receiving a paging signal containing a passcode of the facsimile system, and for automatically converting an operational mode of the facsimile system between a voice communication (TEL) mode and a data communication (FAX) mode when the paging signal contains the passcode of the facsimile system.

BACKGROUND ART

Generally, a facsimile system having facsimile and telephone functions as disclosed, for example, in U.S. Pat. No. 4,901,343 for *Data Communication Apparatus* issued to Yamaguchi, U.S. Pat. No. 4,908,851 for *Facsimile Apparatus Operable In Facsimile Or Conversation Mode* issued to Kotani et al., U.S. Pat. No. 5,065,427 for *Fax/Data Call Receiving System And Method* issued to Godbole, U.S. Pat. No. 5,255,311 for *Data Communication Apparatus* issued to Yoshida, U.S. Pat. No. 5,260,991 for *Facsimile Apparatus* issued to Ikegaya, U.S. Pat. No. 5,323,451 for *Facsimile Device And Automatic Receiving Method* issued to Yatsunami, U.S. Pat. No. 5,337,349 for *Image Telecommunication Apparatus* issued to Furohashi, U.S. Pat. No. 5,448,378 for *Data Transmitting Apparatus And Method For Executing Both Facsimile Communication And Data Communication Without Suspending A Communication Line* issued to Matsumoto, U.S. Pat. No. 5,428,673 for *Data Communication Apparatus Having The Function Of Automatically Switching Data Communication And Telephone Communication* issued to Nakagawa, and U.S. Pat. No. 5,487,105 for *Facsimile Apparatus Operable In Facsimile Or Telephone Mode* issued to Sakai, is well known in the communication art for selectively operating either in a facsimile mode or in a telephone mode.

Many other facsimile systems as disclosed, for example, in U.S. Pat. No. 5,086,455 for *Facsimile Arrangement Having Automatic Answering Telephone Set And Facsimile Set And Switching Process Therefor* issued to Satomi et al., U.S. Pat. No. 5,131,026 for *Facsimile System Having Auto-Answering Function* issued to Park, and U.S. Pat. No. 5,333,179 for *Facsimile Apparatus With Automatic Answering Telephone Function* issued to Yamamoto et al., are constructed with an automatic telephone answering device for recording a voice message from a calling subscriber when a user is not in the vicinity of the facsimile system to answer an incoming call.

In such a system, the facsimile machine and the telephone answering machine must be set manually by the user in an automatic voice answer mode in order to receive both fax and voice messages when the owner is absent. When the facsimile system is set in the automatic voice answer mode, and a call comes in, the telephone answering machine answers and plays the recorded announcement. If the call is from a person, the calling subscriber can leave a message following the normal instructional procedure for the answering machine. If the call is from another facsimile system however, the facsimile system switches over to an automatic reception mode for automatically receiving the document. In this arrangement, if the user neglects or fails to manually set the facsimile system and the telephone answering device in this operating mode however, the facsimile system and the telephone have difficulty in timely performing the voice communication (TEL) and image data reception (FAX) functions. Hence, the facsimile system can only selectively receive the caller's voice or data message according to either the voice communication (TEL) mode or the image data reception (FAX) mode.

In order to facilitate the image data reception and automatic answer functions from a remote distance, a facsimile system equipped with a telephone has recently been constructed such as disclosed in U.S. Pat. No. 5,189,693 for *Remote Control Facsimile Apparatus With Remotely Set Operation Mode* and U.S. Pat. No. 5,216,706 for *Communication Apparatus Having Remote Control Operation Mode* both issued to Nakajima, to incorporate a remote control operational mode in which respective image data reception and automatic answer functions can be controlled based on a predetermined remote control code transmitted from a remote telephone terminal. Using this construction however, the user must either memorize the remote control code or carry a wallet-sized card containing such remote control code in order to remotely control the functions of the facsimile system. I have found however, that even if the user carries the card containing such a remote control code, there may still be other problems inherently associated with the remote mode conversion operation such as, for example, entry of an incorrect code when the user fails to enter the correct remote control code.

SUMMARY OF THE INVENTION

Accordingly, it is an object of the present invention to provide an improved facsimile system and process for operation of the system.

It is also an object to provide an improved facsimile system having a paging receiver incorporated therein and process of changing an operational mode of the facsimile system between voice communication (TEL) and data communication (FAX) from a radio pager at a remote location.

It is another object to provide an improved facsimile system having a paging receiver and a telephone handset or speakerphone incorporated therein and process of automatically changing operationally into an automatic telephone answer (ANS) mode from a radio pager at a remote location and thereby efficiently responding to an incoming call regardless of whether the incoming call is from a telephone or another facsimile system.

These and other objects of the present invention can be achieved by a facsimile system having a paging receiver incorporated therein and operable in either a voice communication (TEL) mode or a data communication (FAX) mode, and a process of changing an operational mode of the facsimile system by the steps of: periodically checking the data received from the radio pager, and changing the operational mode upon receipt of predetermined data.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
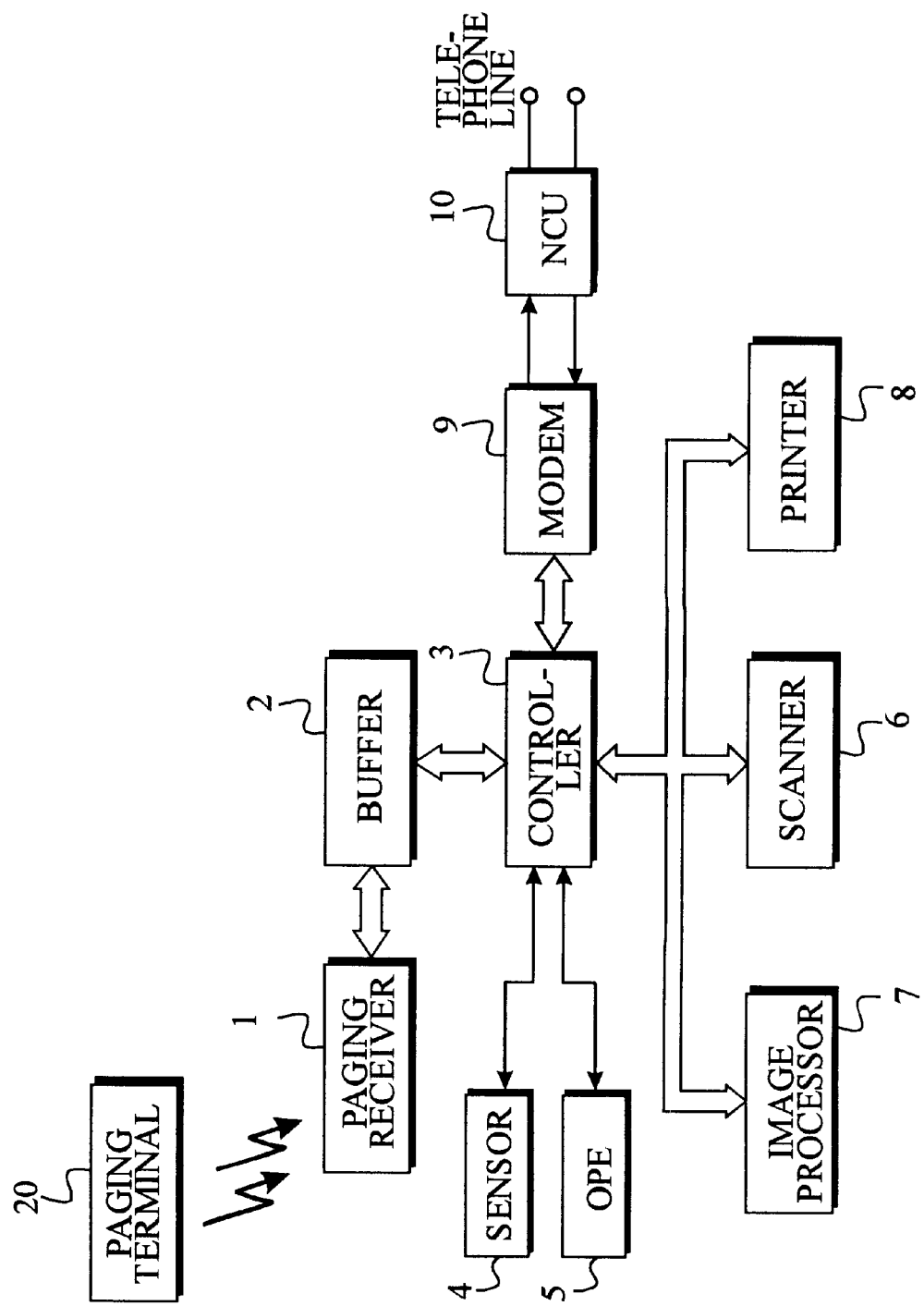
FIG. 1 is a schematic block diagram illustrating a facsimile system having a paging receiver constructed according to the principles of the present invention.

Referring now to the drawings and particularly to FIG. 1, which illustrates a facsimile system having a pager call receiver constructed according to the principles of the present invention. The facsimile system includes a paging receiver (i.e., radio pager) 1 incorporated therein for receiving a pager call signal containing a unique passcode specific to the paging receiver 1 of the facsimile system from a user via a paging terminal 20 at a remote location regardless of the operational mode of the facsimile system; a buffer 2 for temporarily storing the pager call signal when the pager call signal contains the unique passcode of the facsimile system, a controller 3 for controlling operations of the facsimile system, a sensor 4, an operational panel OPE 5, a scanner 6, an image processor 7, a printer 8, a modem 9, a network control unit NCU 10, and a telephone handset (not shown).

The controller 3 contains a program memory such as a ROM (not shown) which stores programs for controlling the general operation of the facsimile system in either one of a transmission mode, a reception mode and a copy mode, and a data memory such as a RAM (not shown) which temporarily stores various items of information. A program for performing an operational mode switching of the facsimile system as contemplated by the present invention may be stored in the program memory. The OPE 5 has a key input unit including a plurality of numerical and functional keys for generating key data to the controller 3 when pressed by the user for designating different mode of operation and the operation of the designated mode, and a display unit for providing a visual display of data indicative of the designated mode of operation of the facsimile system while performing each mode of operation. The sensor 4 senses whether a document is input into the facsimile system, or whether copy paper is stored and available for use, and generates an indicative signal to the controller 3. The scanner 6 transports and scans an image of the input document and then generates image data corresponding to the scanned image. The image processor 7 processes the image data output from the scanner 6 in order to generate processed image data for either transmission via a telephone line or copy during the copy mode under control of the controller 3, and processes the image signal received from the telephone line during the reception mode. The printer prints the image data received from the image processor 7 on a printable medium such as individual cut sheets of papers during the reception mode and the copy mode under the control of the controller 3. The modem 9 modulates the image data output from the image processor 7 into a modulated image signal for transmission, and duplicates the image signal input to the image processor 7 during the reception mode under the control of the controller 3. The network control unit (NCU) 10 is connected with the telephone line to form transmission and reception paths for the modem 9 under the control of the controller 3.

Figure 2:
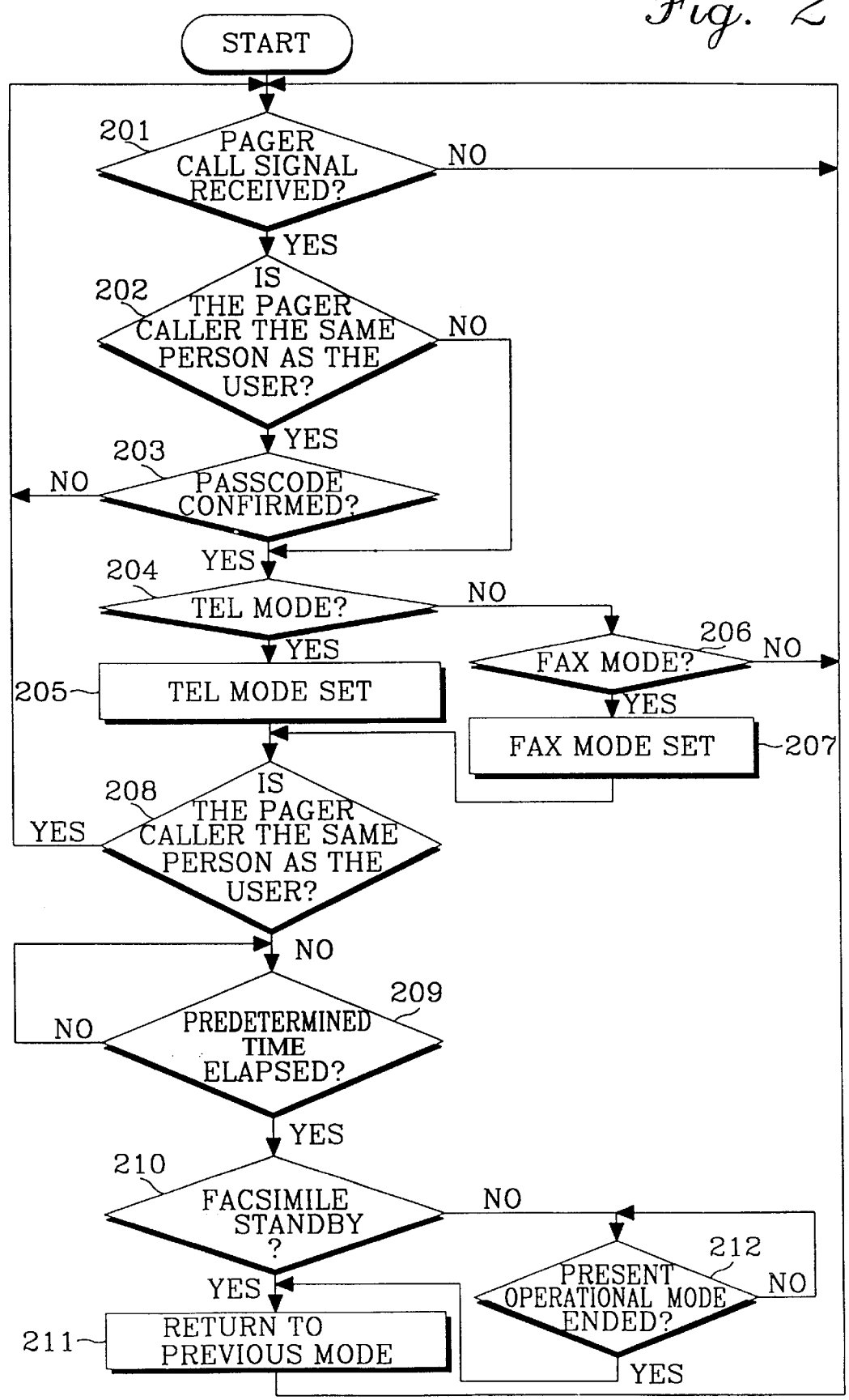
FIG. 2 is a flow chart illustrating an automatic switching of an operational mode of a facsimile system according to a preferred embodiment of the present invention.

Turning now to FIG. 2 which illustrates a process of switching an operational mode of a facsimile system having a paging receiver constructed according to a preferred embodiment of the present invention. The controller 3 first checks the buffer 2 to obtain the data stored therein when there is a pager call signal at step 201. The controller 3 then determines whether the pager caller is the same person as the user or another fax transmitter at step 202. If the pager caller is the user, the controller 3 checks the passcode from data contained in the pager call signal to confirm that the pager caller is the user at step 203. If the passcode is not confirmed, the controller 3 keeps on checking whether there exists a pager call signal. Alternatively, if the passcode is confirmed when the passcode is specific to the paging receiver of the facsimile system, the controller 3 analyzes the bit of the data representing the operational mode to set the facsimile system to a voice communication (TEL) mode at steps 204 and 205 or to a data communication (FAX) mode at steps 206 and 207.

If the pager caller is not checked as the user in step 208, the controller 3 analyzes the bit of the data representing the operational mode to set the facsimile system to the voice communication (TEL) mode or the data communication (FAX) mode. Thereafter, the controller 3 counts a predetermined time (e.g., 60 seconds) at step 209. If the facsimile system is in a standby state after the predetermined time has elapsed at step 210, the controller 3 returns the present mode to the previous mode in step 211. Then, the controller 3 keeps on checking whether there exists a pager call signal. When the facsimile system is checked not in a standby state at step 210, there is checked in step 212 whether the present operational mode has terminated or not. If the present operational mode has terminated, the facsimile system is returned to the previous operational mode at step 211, or otherwise, the present operational mode is continued.

Figure 3:
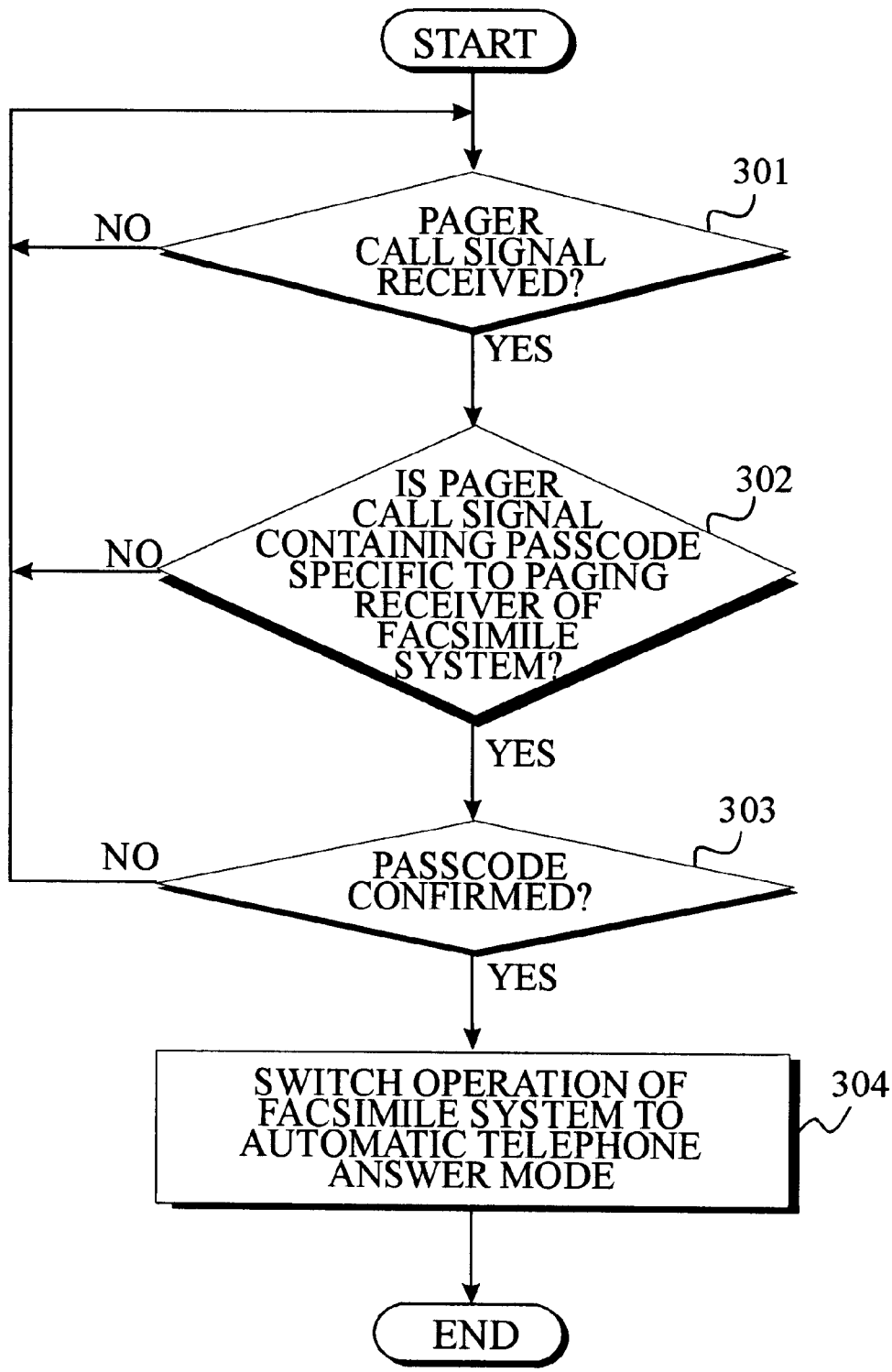
FIG. 3 is a flow chart illustrating an automatic switching of an operational mode of a facsimile system according to another embodiment of the present invention.

FIG. 3 illustrates a process of switching an operational mode of a facsimile system having a paging receiver constructed according to another embodiment of the present invention. In this embodiment, the facsimile system as contemplated has a number of basic modes of reception such as a data communication (FAX) mode which sets the facsimile system to treat all incoming calls as fax transmissions and to ignore the telephone calls, a voice communication (TEL) mode which sets the facsimile system to treat all incoming calls from either a telephone or fax as telephone calls and ring every time until the user answers the incoming calls first, an automatic TEL/FAX mode which sets the facsimile system to check all incoming calls to see if they are from a fax or telephone. If the call is from another fax, the facsimile system receives the document without ringing. If the call is from a telephone, the facsimile system rings to alert the user to pick up the handset and to answer the call. An automatic telephone answer mode is further contemplated to receive all fax transmissions as well as telephone messages. That is, when a call comes in, the answering machine answers and plays the recorded announcement. If the call is from a person, the calling subscriber can leave a voice message following the normal procedure for the answering machine. If the call is from another fax however, the facsimile system automatically switches over to the FAX mode after a predetermined time period in order to receive the document in a timely fashion. The paging receiver is intended primarily for the facsimile system to automatically switch an operating mode to an automatic telephone answer mode, when the user fails to manually set the facsimile system in such an operating mode in case the facsimile system is left unattended. The automatic operational mode switching according to the present invention is validated based upon reception of a pager call signal and whether the pager call signal contains a unique passcode specific to the paging receiver of the facsimile system.

As shown in FIG. 3, the controller 3 first checks the buffer 2 to obtain data stored therein when a pager call signal is received at step 301. The controller 3 then determines whether the pager call signal contains a unique passcode specific to the paging receiver of the facsimile system at step 302. When the pager call signal contains the unique passcode specific to the paging receiver of the facsimile system at step 302, the passcode is confirmed at step 303. After the passcode is confirmed at step 303, the controller 3 automatically switches the operational mode of the facsimile system from any one of the operational modes previously set by the user such as the voice communication (TEL) mode, the data communication (FAX) mode, and the automatic TEL/FAX mode into an automatic telephone answer mode. In the event that the operational mode of the facsimile system was manually set in the automatic telephone answer mode, there is no need to switch the facsimile system into the same mode of operation. However, if the operational mode of the facsimile system was manually set in any one of the voice communication (TEL) mode, the data communication (FAX) mode, and the automatic TEL/FAX mode, the controller 3 will switches the operational mode of the facsimile system into an automatic telephone answer mode in order to effectively respond to all other incoming call regardless of whether such an incoming call is from a telephone or from another facsimile system.

As described above, the present invention provides a facsimile system with means for changing the operational mode to a TEL mode or a FAX mode from a remote location by means of a radio pager call, so that it is not necessary for the user to manually handle the facsimile machine in order to change the operational mode. As a result, there is achieved a great advantage and convenience in using the facsimile system, especially in time and expense.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for changing an operational mode of a facsimile system having a paging receiver incorporated therein and operating in one of a voice communication mode and a data communication mode, comprising the steps of:

receiving at said paging receiver a paging signal transmitted from a user via a paging terminal;

determining whether the paging signal received at said paging receiver contains a passcode specific to said paging receiver incorporated in said facsimile system; and automatically changing the operational mode of said facsimile system into one of said voice communication mode and said data communication mode when the paging signal contains said passcode specific to said paging receiver incorporated in said facsimile system.

2. The method of claim 1, further comprising the steps of:

comparing said passcode contained in the paging signal received at the paging receiver with a unique code of said facsimile system to identify a user;

determining the present operational mode of said facsimile system when said passcode identifies the user; and automatically changing the operational mode of said facsimile system when the present operational mode does not represent an operational mode required by the paging signal received from the paging receiver.

3. The method of claim 2, further comprising the steps of:

determining the present operational mode of said facsimile system when said passcode does not identify said user; and automatically changing the operational mode of the facsimile system when the present operational mode of said facsimile system does not represent the operational mode required by the paging signal received at the paging receiver.

4. The method of claim 2, further comprised of changing said operational mode of said facsimile system into one of said voice communication mode and said data communication mode.

5. The method of claim 3, further comprised of changing said operational mode of said facsimile system into one of said voice communication mode and said data communication mode.

6. The method of claim 4, further comprised of said paging signal including message data for instructing said facsimile system to change the operational mode into one of said voice communication mode and said data communication mode.

7. A method for automatically converting an operating mode in a facsimile system operable in a voice communication mode, a data communication mode, a voice/data communication mode, and an automatic telephone answer mode, said method comprising the steps of:

receiving a paging signal from a radio pager;

determining whether the paging signal contains a passcode when the paging signal is received from said radio pager; and automatically converting an operating mode of the facsimile system into said automatic telephone answer mode when the passcode contained in the paging signal is accepted by said facsimile system.

8. The method of claim 7, further comprised of the operating mode of the facsimile system including one of said voice communication mode, said data communication mode, and said voice/data communication mode.

9. A method for changing an operational mode of a facsimile system, comprising the steps of:

transmitting a paging signal from a radio pager at a location remote from said facsimile system;

receiving said paging signal transmitted from said radio pager at a paging receiver incorporated into said facsimile system via a paging terminal;

determining whether the paging signal received at said paging receiver contains a passcode specific to said paging receiver incorporated into said facsimile system; and automatically changing the operational mode of said facsimile system into one of a first communication mode and a second communication mode when the paging signal contains said passcode specific to said paging receiver incorporated into said facsimile system.

10. The method of claim 9, further comprising the steps of:

comparing said passcode contained in the paging signal received at the paging receiver with a unique code of said facsimile system to identify a user;

determining a current operational mode of said facsimile system when said passcode identifies the user; and automatically changing the operational mode of said facsimile system when the current operational mode does not represent an operational mode required by the paging signal received at the paging receiver.

11. The method of claim 10, further comprising the steps of:

determining the current operational mode of said facsimile system when said passcode does not identify said user; and automatically changing the operational mode of said facsimile system when the current operational mode does not represent the operational mode required by the paging signal received at the paging receiver.

12. The method of claim 9, further comprised of changing said operational mode of said facsimile system into one of said first communication mode for voice communication and said second communication mode for data communication.

13. The method of claim 11, further comprised of changing said operational mode of said facsimile system into one of said first communication mode for voice communication and said second communication mode for data communication.

14. The method of claim 13, further comprised of said paging signal including message data for instructing said facsimile system to change the operational mode of the facsimile system into one of said first communication mode and said second communication mode.

15. The method of claim 9, further comprised of said paging signal including message data for instructing said facsimile system to change the operational mode of the facsimile system into one of said first communication mode and said second communication mode.

16. The method of claim 15, further comprised of changing said operational mode of said facsimile system into one of said first communication mode for voice communication and said second communication mode for data communication.

17. The method of claim 16, further comprising the steps of:

comparing said passcode contained in the paging signal received at the paging receiver with a unique code of said facsimile system to identify a user;

determining a current operational mode of said facsimile system when said passcode identifies the user; and automatically changing the operational mode of said facsimile system when the current operational mode does not represent an operational mode required by the paging signal received at the paging receiver.

18. The method of claim 17, further comprising the steps of:

determining the current operational mode of said facsimile system when said passcode does not identify said user; and automatically changing the operational mode of said facsimile system when the current operational mode does not represent the operational mode required by the paging signal received at the paging receiver.

19. An apparatus for changing an operational mode of a facsimile system, comprising:

a paging receiver of the facsimile system for receiving a paging signal transmitted from a user; and a controller of the facsimile system for determining whether the paging signal received by said paging receiver contains a passcode specific to said paging receiver incorporated in said facsimile system, and for automatically changing the operational mode of said facsimile system into one of a voice communication mode and a data communication mode when the paging signal contains said passcode specific to said paging receiver incorporated in said facsimile system.

20. An apparatus for automatically converting an operating mode in a facsimile system operable in a voice communication mode, a data communication mode, a voice/data communication mode, and an automatic telephone answer mode, comprising:

a paging receiver of the facsimile system for receiving a paging signal from a radio pager; and a controller of the facsimile system for determining whether the paging signal contains a passcode when the paging signal is received by said paging receiver from said radio pager, and for automatically converting an operating mode of the facsimile system into said automatic telephone answer mode when the passcode contained in the paging signal is accepted by said facsimile system.

21. A system for changing an operational mode of a facsimile system, comprising:

a radio pager for transmitting a paging signal at a location remote from said facsimile system;

a paging receiver of said facsimile system for receiving said paging signal transmitted from said radio pager; and a controller of said facsimile system for determining whether the paging signal received by said paging receiver contains a passcode specific to said paging receiver incorporated into said facsimile system, and for automatically changing the operational mode of said facsimile system into one of a first communication mode and a second communication mode when the paging signal contains said passcode specific to said paging receiver incorporated into said facsimile system.

22. The system of claim 21, wherein said operational mode of the facsimile system is changed into one of said first communication mode for voice communication and said second communication mode for data communication.

* * * * *